Dec. 11, 1956 G. E. WHITNEY 2,773,444

MAGNETIC CORE STORAGE FOR BUSINESS MACHINES

Filed Nov. 27, 1953 6 Sheets-Sheet 1

| ZONE PUNCH / NUMERICAL PUNCH | NO ZONE PUNCH | X & O | X | O |
|---|---|---|---|---|
| NONE | | & | \ | O |
| 1 | 1 | A | J | / |
| 2 | 2 | B | K | S |
| 2-1 | 3 | C | L | T |
| 4 | 4 | D | M | U |
| 4-1 | 5 | E | N | V |
| 4-2 | 6 | F | O | W |
| 4-2-1 | 7 | G | P | X |
| 8 | 8 | H | Q | Y |
| 8-1 | 9 | I | R | Z |
| 8-2-1 | # | . | $ | , |
| 8-4 | @ | + | * | % |

INVENTOR
GORDON E. WHITNEY
BY John C. Hall
ATTORNEY

INVENTOR
GORDON E. WHITNEY
BY John A. Hall
ATTORNEY

Dec. 11, 1956 G. E. WHITNEY 2,773,444

MAGNETIC CORE STORAGE FOR BUSINESS MACHINES

Filed Nov. 27, 1953 6 Sheets-Sheet 3

INVENTOR
GORDON E. WHITNEY
BY John A. Hall
ATTORNEY

Dec. 11, 1956 G. E. WHITNEY 2,773,444

MAGNETIC CORE STORAGE FOR BUSINESS MACHINES

Filed Nov. 27, 1953 6 Sheets-Sheet 4

INVENTOR
GORDON E. WHITNEY
BY [signature]
ATTORNEY

INVENTOR
GORDON E. WHITNEY
BY
ATTORNEY

Dec. 11, 1956 G. E. WHITNEY 2,773,444

MAGNETIC CORE STORAGE FOR BUSINESS MACHINES

Filed Nov. 27, 1953 6 Sheets-Sheet 6

INVENTOR
GORDON E. WHITNEY
BY [signature]
ATTORNEY 2,773,444

MAGNETIC CORE STORAGE FOR BUSINESS MACHINES

Gordon Earle Whitney, Derby, Colo., assignor to International Business Machines Corporation, New York, N. Y., a corporation of New York Application November 27, 1953, Serial No. 394,570

5 Claims. (Cl. 101—93)

This invention relates to business machines for processing information recorded in code on punched cards and particularly to the use of magnetic cores for storing information gleaned from a card during the process of interpretation and translation of the said coded information.

The object of the present invention is simplicity, economy of space, speed of operation and reliability of a means for reading off the coded information punched in a card and delivering such information to a translating and transmitting device. Although reading of the information on such records may easily be accomplished by an experienced operator it becomes difficult for one who is not familiar with the general system, and even by the experienced operator it involves an act of translation or interpretation. An object of the present invention then is to provide means for the automatic interpretation of a punched card and the printing thereon of the translation.

In a specific embodiment of the present invention designed for use with certain conventional punched cards known as double deck cards, the information is read off the card in six steps (in time) each sensing eighty places (in space) so that the recorded information may be registered on a matrix of 480 magnetic cores. Thereafter the registered information is fed into two sets of translating means in forty steps (in time) in codes of six places (in space). The double deck card is one designed to accommodate an upper deck of eighty columns of six rows which may be punched in code and a similar lower deck. This invention however is not limited to this specific type of card, nor indeed to punched cards but may be applied to any conventional code bearing means such as the conventional punched tapes used in accounting machines, calculators and sequence controlled devices for automatic machinery.

The codes, or perhaps more accurately, the full record of a card or a deck of a card are read off without regard to any code combinations in the quickest way, that is, the card is moved in the equivalent of an up or down motion so that in six steps every hole in each of the conventional eighty columns may be detected and registered. Thereafter, as the card is moved sideways forty steps, the registered record corresponding to each column is sensed and a translating means controls a pair of printers so that the translated code is printed on the card in alignment with the punched code.

The characteristically novel feature of the present invention resides in a magnetic element memory device or matrix having a bistable magnetic element for each place on the card where a code element might be punched. The matrix comprises a complex interconnection of three coils on each of said elements or cores, one for driving the core on input from its normal to its alternate magnetic state, one for driving the core on output from its alternate to its normal magnetic state, and a third for transmitting a signal as the core is in process of being driven from its alternate to its normal magnetic state.

A feature of the invention is an array of magnetic elements which may be enabled or driven from one state to another in a few groups each of a large number to rapidly register a record and from which the record may be read out in a large number of groups each of a limited number corresponding to the number of places in a code employed. In the interest of speed the cards are sensed and the record made in the matrix eighty points in space by six points in time and later read out in the opposite order, that is, forty points in time by six points in space. This time space arrangement is of considerable importance in the overall speed of processing of the cards.

Another feature of the present invention is a matrix of coordinately arranged bistable magnetic memory elements by means of which a business record may be sensed electrically so that information thereon may be registered magnetically in an exact duplicate configuration thereof, whereby groups of said elements each including a number of bits for a code may be electromagnetically enabled and whereby the code registered in each said group enabled may be electrically transmitted to suitable code responsive recording means such as a printer.

Other features will appear hereinafter.

The drawings consist of six sheets having eight figures, as follows.

Prior art disclosing many of the mechanical elements of the machine and showing the general mode of operation of an interpreter are represented by the following patents: 1,379,268, Lake, May 24, 1921; 2,019,869, Page, Nov. 5, 1935; 2,076,713, Ford, Apr. 13, 1937; 2,181,996, Knutson, Dec. 5, 1939.

Figures 1, 2:
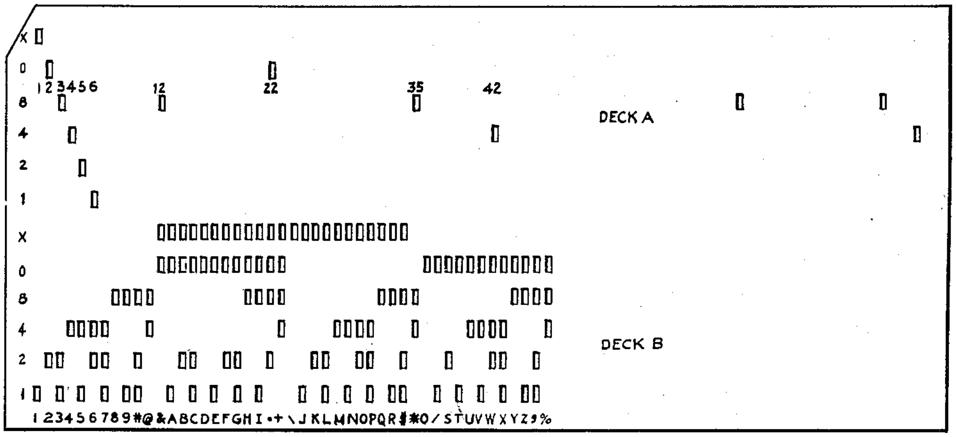
Fig. 1 is a view of a double deck card, showing perforations in the first 47 columns of its Deck B and the printed interpretation of the codes in these 47 columns in the lower margin of the card.
Fig. 2 is a table of codes employed and each of which may easily be checked with the punched card of Fig. 1.

Little need be said about Figs. 1 and 2 as a mere inspection thereof will make it clear that the card may be used to record the information in two decks each having eighty items (columns) in a six bit code, shown in example in Fig. 1 and by chart in Fig. 2. There are two lines of zone punchings in each deck shown on the card of Fig. 1 as X and 0, and four lines of punchings in each deck known as 1, 2, 4, and 8 bits, by which the code is built up to represent 47 characters (no character is represented by an entire absence of punched holes in a column).

Figure 3:
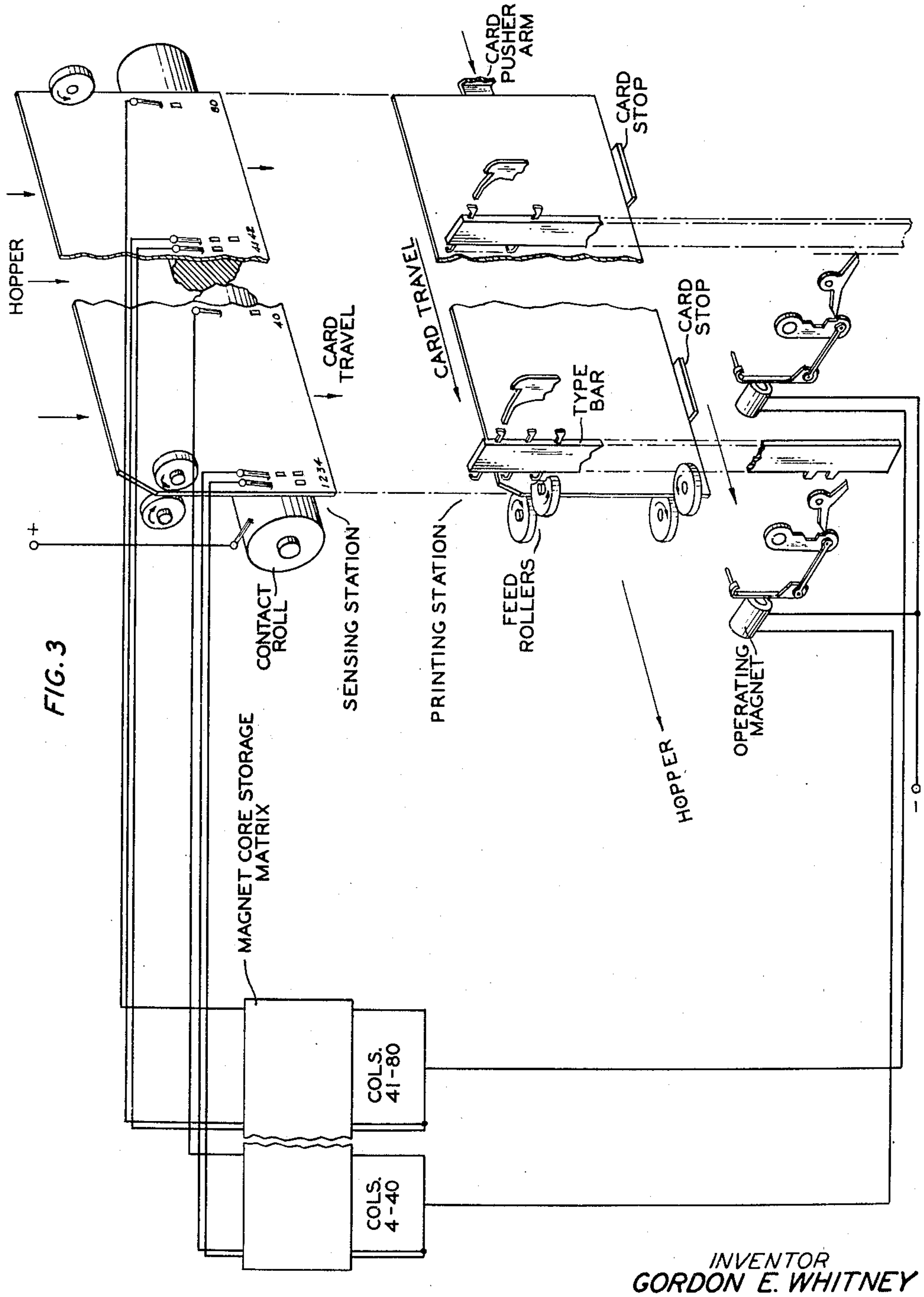
Fig. 3 is a schematic drawing including mechanical elements in perspective, fragmentary and partly in section, indicating direction of movement of a card and also including the indications of a electrical circuit diagram.

The process of interpretation is indicated in Fig. 3. Here a card is shown at two positions in transit from hopper to hopper. In the first position shown in the upper right hand corner of the figure the card has emerged from a hopper and is traveling downwardly and in cooperative relationship with a contact roll and a set of eighty brushes, one for each column, whereby the punched holes are sensed and corresponding magnetic cores in the matrix are operated.

In this particular machine two printers are used and are simultaneously operated. One printer is spaced 40 columns from the other so that when the first is poised above column 1, the other will be poised above column 41. The record in the matrix is then read, two columns at a time and these lines are interpreted and the corresponding characters are simultaneously printed. The card, now in its second position is impelled to move sideways so that in forty steps eighty codes may be sensed, interpreted and printed. Details of the printing mechanism, by which the type bars may be properly positioned and selectively hammered are indicated here and shown in detail in the prior art disclosures above noted.

The invention resides in the use of bistable magnetic cores for registering and storing the information gleaned from a card in transit until this information can be interpreted and printed on the card, still in transit.

Figure 4:
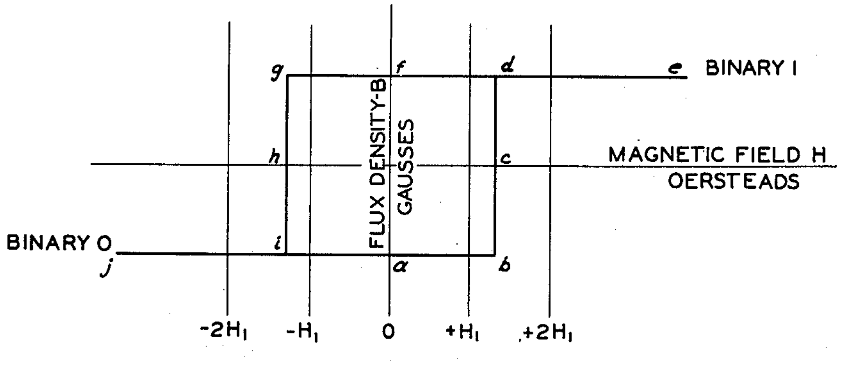
Fig. 4 is an idealized representation of a hysteresis curve of the magnetic material used in the bistable magnetic elements of the present invention.

The bistable magnetic core is represented on Fig. 4 by an idealized drawing of its hysteresis loop. The core consists of known and commercially available magnetic material which is stable at either of two points of remanence. If it is at the point *a*, which we may designate as binary 0 it will remain at that point indefinitely. If by any means such as through a winding cooperatively associated therewith it is energized by a magnetomotive force of $-H_1$ or $-2H_1$, its state will not be changed but it will return to point *a*. If it is energized by a magnetomotive force of $+H_1$, insufficient to reach the knee of the curve *b*, then on relaxation of this force it will likewise return to the point *a*. If, however, a force of $+2H_1$, is applied, then the curve *abcde* will be traversed and on relaxation of the force the material will revert to the state *f*, from which it may be dislodged only by a force of something more than $-H_1$ whereby the knee of the curve *g* may be passed.

Such bistable magnetic cores are tiny, may be stacked in compact arrays, and will remain in one or the other of their magnetic states indefinitely.

Figure 5:
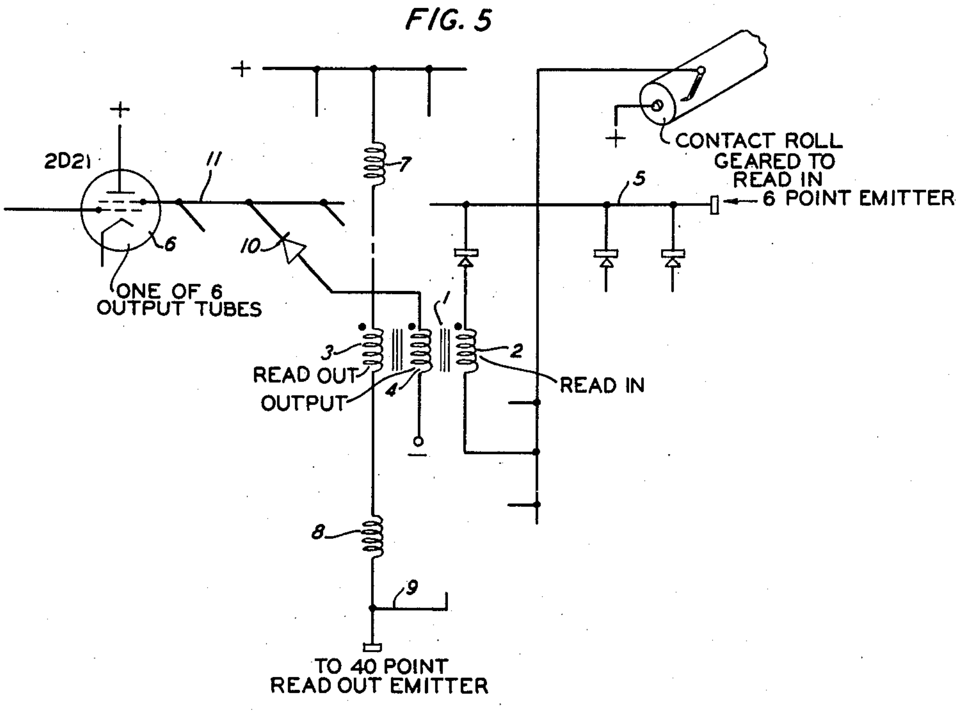
Fig. 5 is a fragmentary circuit diagram showing the various connections to the coils of a single magnetic element.

Fig. 5 is a representation of one of the 480 cores employed in the matrix. This shows a core 1 carrying a Read In coil 2, a Read Out coil 3, and an output coil 4. These coils are arranged in 6 rows of 80 columns. There are 6 multiple wires 5 to each of which 80 Read In coils are multiplied. These 6 multiple wires lead to a 6 point emitter geared to the card moving mechanism whereby each wire may be enabled in a circuit as the corresponding horizontal row of punchings in the card comes under the contact brushes whereby in 6 steps the entire record of one deck of the card may be taken off and recorded in the matrix. Each core is also provided with a Read Out coil 3 through which a pulse may be transmitted to move the core toward binary 0. If the Read In coil had been effectively energized to move the core to binary 1, then this pulse in the Read Out coil 3 would be effective and in the collapse of the field and its build up in the opposite direction a pulse would be created in and transmitted from an output coil 4 to fire a tube 6 which would in turn operate one of the 6 conventional magnets for operating the printer. The Read Out coil is represented as being included in series with similar read out coils 7 and 8 leading to a 40 point Read Out emitter geared to successively make contact with circuits representing the various columns of perforations as the printer is poised over such columns. In the particular device described and indicated in Fig. 3, two printers are employed so the multiple connection 9 leads to another series of Read Out coils 40 columns away, columns 1 and 41 are tied together, by way of example.

Each output coil 4 is connected through a diode 10 to one of six multiple wires 11 leading to the said six tubes for operating the conventional six printer magnets. A pulse through a series of six read out coils will selectively operate the six output tubes.

Figure 6:
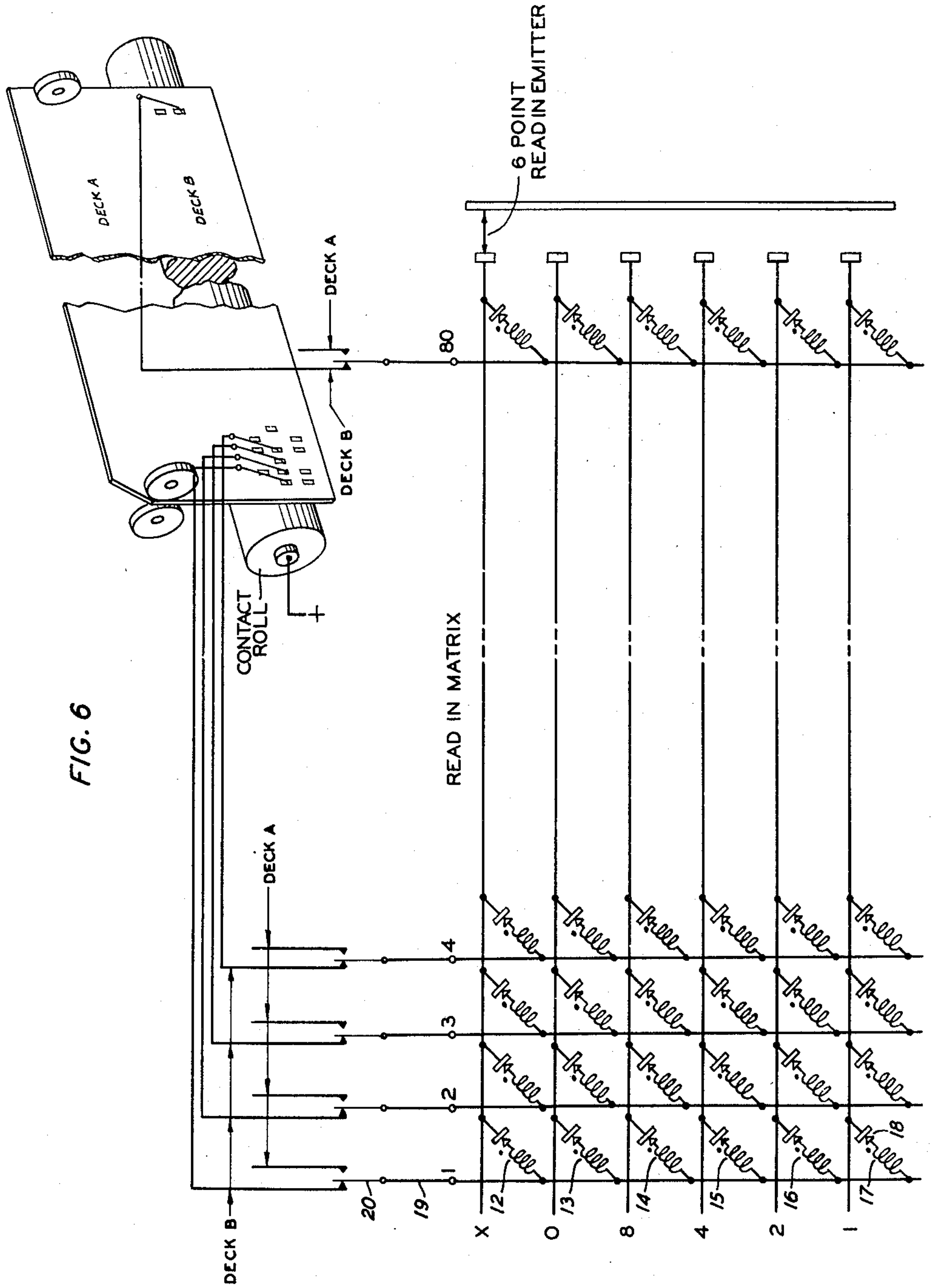
Fig. 6 is a fragmentary circuit diagram showing the manner in which the Read In coils are connected in the matrix.

Fig. 6 shows the arrangement for the input windings in somewhat more detail. This clearly shows the six coils 12 to 17 connected in multiple to one of the 80 brushes and each connected to an emitter contact. Each coil is connected in series with a unidirectional current element or diode, such as 18, necessary in such a matrix array. Each brush wire, such as conductor 19, is connected to a relay armature 20 whereby such wire may be connected to either the Deck A or Deck B contact roll brushes, not shown in detail since the novel aspects of the present invention do not reside in such conventional arrangements.

Figure 7:
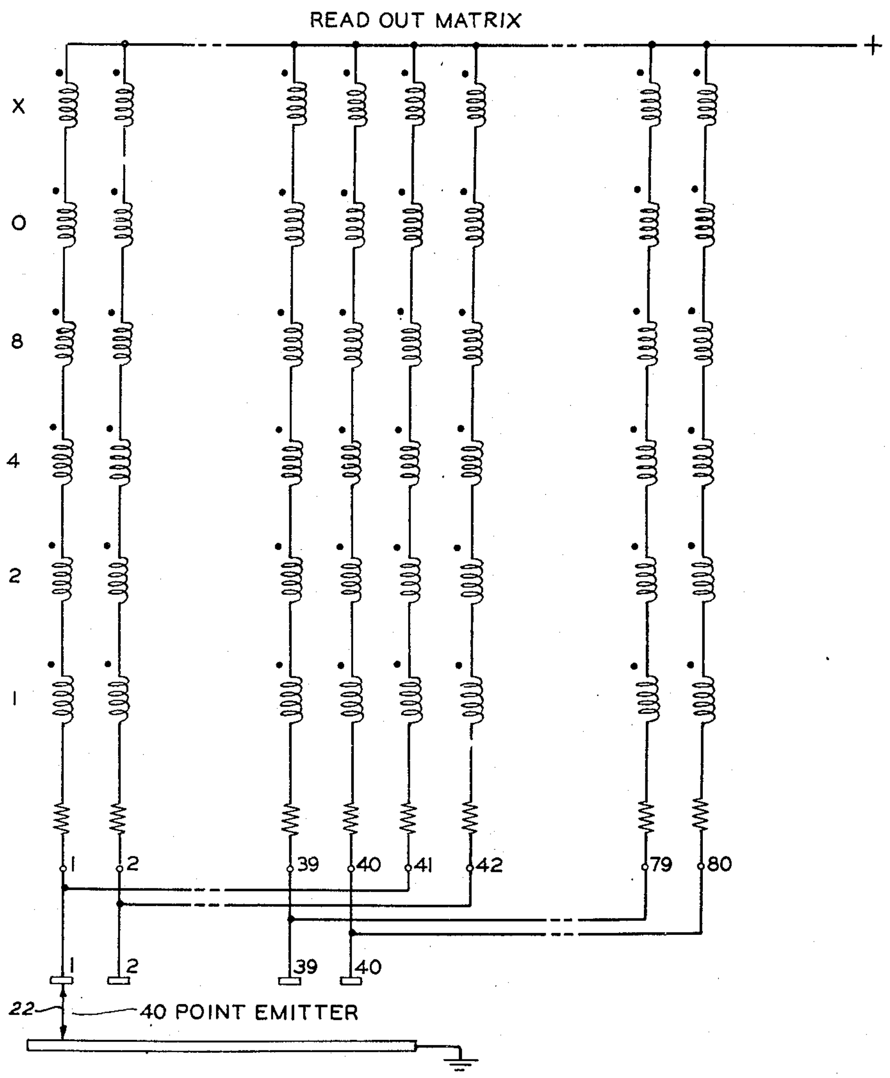
Fig. 7 is a fragmentary circuit diagram showing the manner in which the Read Out coils are connected in the matrix.

In Fig. 7 the connections of the Read Out coils (such as 3, 7 and 8 of Fig. 5) are shown. As the Read Out emitter 22 passes successively over the 40 contacts of this device, the two printers indicated in Fig. 3 will be poised over corresponding columns of the card. Current through the coils of the two series of six coils each will tend to drive the corresponding cores to their normal (binary 0) state and from each core which had been previously driven to its binary 1 state a pulse will be transmited to operate a printer magnet.

Figure 8:
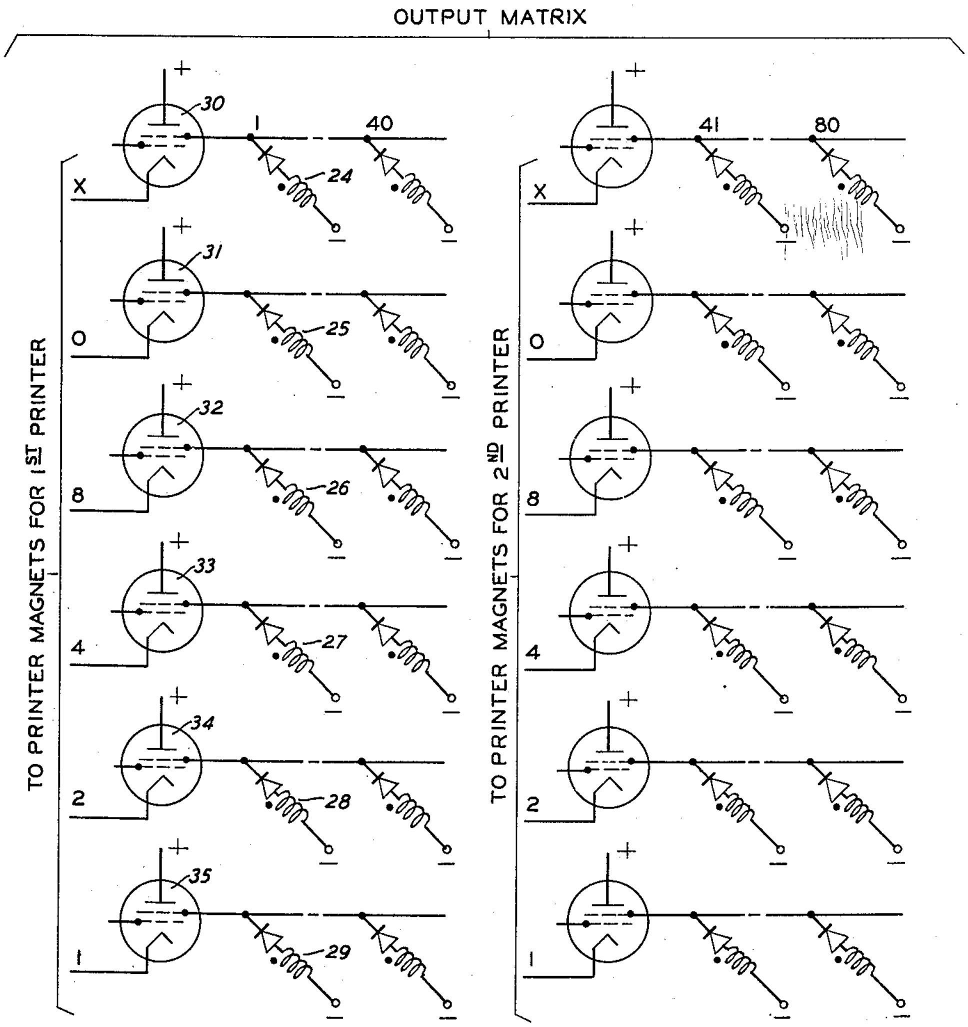
Fig. 8 is a fragmentary circuit diagram showing the manner in which the output coils are connected in the matrix.

Fig. 8 shows, schematically, the connections of the output coils, such as the coil 4. When a (vertical) group of six coils, as in Fig. 7, is energized to drive the corresponding cores from binary 1 to binary 0, voltages will be induced in the corresponding coils of Fig. 8 and the corresponding tubes will be fired to operate the corresponding print magnets. If, by way of example, the code X, 0, 4, 1 for the letter E has been recorded in the number 1 column, then as the emitter 22 of Fig. 7 makes contact with the number 1 contact the cores for coils 24, 25, 27 and 29 will be driven from binary 1 to binary 0 and tubes 30, 31, 33 and 35 will be fired. No voltage will be induced in coils 26 and 28 and consequently tubes 32 and 34 will not be fired.

It will be apparent that the complete matrix will be a composite of Figs. 6, 7 and 8 with connections made as indicated in Fig. 5.

It may also be noted that the connections of Fig. 8 may be varied. If but a single printer is to be used, then the emitter 22 will successively pass over eightly points and in the output matrix but a single set of printer magnet driving tubes will be employed, the wire to each being multiplied to eighty output coils instead of to a group of forty as shown.

What is claimed is:

1. In a business machine, a matrix of coordinately arranged bistable magnetic memory elements for registering in duplicate configuration coded information from a business record, a business record, means for sensing said business record and transmitting sensed information to said matrix in successive lines along one coordinate direction thereof to change the magnetic state of each magnetic element in said line corresponding to sensed bits in a correspondingly sensed line of said record, means for successively energizing groups of said elements in lines along another coordinate direction thereof to change the magnetic state of each said element changed during said operation of sensing said business record, the elements in each said last lines being equal in number to the number of places in a code and means controlled by said elements responsive to a change in state for transmitting correspondingly coded electrical pulses suitable for the operation of a code responsive recording means.

2. In a business machine, a matrix of coordinately arranged bistable magnetic memory elements for registering in duplicate configuration coded information from a business record, a business record having information expressed in bits in a comparatively large number of columns in a comparatively few number of lines, means for electrically sensing said business record by lines and transmitting electrical pulses representing sensed information to corresponding lines of said elements in said matrix, means for successively energizing groups of said elements corresponding to the said columns of said business record, to change the magnetic state of each said element changed during said operation of sensing said business record, the elements in each said column being equal in number to the number of elements in a code and means controlled by said elements responsive to a change in state for transmitting correspondingly coded electrical pulses suitable for the operation of a code responsive recording means.

3. In a business machine, a matrix of bistable magnetic memory elements arranged in a comparatively large number of columns in a comparatively small number of lines, an input winding on each said element connected in parallel to a conductor individual to each said line, means for successively making contact to each said conductor, a business record having information expressed in bits in a like arrangement of columns and lines, means for successively and simultaneously sensing a line of record bits in a corresponding line of a business record, a read out winding on each said element, the read out windings of a column being connected in series in a circuit leading to a contact maker, means for operating said contact maker to enatble said column winding circuits successively, an output winding for each element connected in parallel to a second conductor individual to each said line of elements and means connected to each of said second conductors for operating a code responsive recording means.

4. A business machine in the form of an interpreter for scanning business records perforated in codes in a comparatively large number of columns and a comparatively small number of lines in which the cards are moved sideways to successively scan the separate lines of code perforations and thereafter moved endways to successively position each column of code perforations in alignment with a printer, characterized in this that there is provided a matrix of bistable magnetic memory elements arranged in a like configuration of a comparatively large number of columns and a comparatively small number of lines, means for registering information by change of state of said magnetic elements responsive to the said scanning of said card as it is moved sideways, means for reversing the state of such of those magnetic elements as have responded during said scanning operation thereafter during said endways movement of said card and means responsive to said state reversals for selectively operating said printer whereby an interpretation of each perforated code in each said column is printed on said card in alignment with each said coded column.

5. In a business machine, a matrix of bistable magnetic memory elements arranged in a comparatively large number of columns in a comparatively small number of lines, an input winding on each said element of each said line connected in parallel to a conductor individual to said line, means for successively making contact to each said conductor, a business record having information expressed in bits in a like arrangement of columns and lines, means for successively sensing a line of record bits in a corresponding line of a business record simultaneously with said making of said contact to said conductors, a read out winding on each said element, the read out windings of a column being connected in series in a circuit leading to a contact maker, a plurality of said circuits being connected to each said contact maker, means for operating said contact maker to enable said column winding circuits, said circuits being arranged in groups whereby the first and successive columns of each said group are simultaneously and successively enabled, an output winding for each element of each said group connected in parallel to a second conductor individual to each said line of elements and means for each said group connected to each of said second conductors for operating a code responsive recording means individual to each said group, whereby a plurality of columns may be simultaneously enabled, translated and recorded.

References Cited in the file of this patent

UNITED STATES PATENTS

| | | |
|---|---|---|
| 2,019,869 | Page | Nov. 5, 1935 |
| 2,540,654 | Cohen et al. | Feb. 6, 1951 |
| 2,575,017 | Hunt | Nov. 13, 1951 |
| 2,692,551 | Potter | Oct. 26, 1954 |

FOREIGN PATENTS

| | | |
|---|---|---|
| 566,964 | Great Britain | Jan. 22, 1945 |

OTHER REFERENCES

"Ferrites Speed" (Brown and Albers-Schoenberg), Electronics, April 1953 (pages 146–149).